US010252950B2

(12) United States Patent
Young et al.

(10) Patent No.: US 10,252,950 B2
(45) Date of Patent: *Apr. 9, 2019

(54) METHODS AND COMPOSITIONS FOR DIGESTION OF ORGANIC WASTE

(71) Applicant: REDF-ORGANIC RECOVERY, LLC, Bernardsville, NJ (US)

(72) Inventors: Jeffrey W. Young, Pompano Beach, FL (US); Lewis A. Spencer, South Dartmouth, MA (US)

(73) Assignee: CALIFORNIA SAFE SOIL, LLC, McClellan, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/329,512

(22) Filed: Jul. 11, 2014

(65) Prior Publication Data

US 2014/0366596 A1 Dec. 18, 2014

Related U.S. Application Data

(62) Division of application No. 12/338,446, filed on Dec. 18, 2008, now abandoned.

(60) Provisional application No. 61/015,531, filed on Dec. 20, 2007.

(51) Int. Cl.
| | |
|---|---|
| C05F 9/04 | (2006.01) |
| C05F 5/00 | (2006.01) |
| C05F 9/00 | (2006.01) |
| C05F 17/00 | (2006.01) |
| C05F 17/02 | (2006.01) |
| C13K 1/02 | (2006.01) |
| C13K 1/06 | (2006.01) |

(52) U.S. Cl.
CPC ............... *C05F 9/04* (2013.01); *C05F 5/00* (2013.01); *C05F 9/00* (2013.01); *C05F 17/0036* (2013.01); *C05F 17/0072* (2013.01); *C05F 17/0276* (2013.01); *C13K 1/02* (2013.01); *C13K 1/06* (2013.01); *Y02A 40/209* (2018.01); *Y02A 40/214* (2018.01); *Y02A 40/216* (2018.01); *Y02P 20/145* (2015.11); *Y02W 30/43* (2015.05)

(58) Field of Classification Search
None
See application file for complete search history.

(56) References Cited

U.S. PATENT DOCUMENTS

| | | | | |
|---|---|---|---|---|
| 4,129,260 A | * | 12/1978 | Baker | B02C 13/04 241/194 |
| 5,374,659 A | | 12/1994 | Gowan, Jr. | |
| 6,121,032 A | | 9/2000 | Cooney, Jr. | |
| 2004/0167073 A1 | | 8/2004 | Sidelman | |
| 2005/0037109 A1 | * | 2/2005 | Soerensen | A23J 1/002 426/56 |
| 2005/0252261 A1 | * | 11/2005 | Lee | B09B 3/00 71/6 |
| 2006/0194299 A1 | | 8/2006 | Brinch-Pedersen et al. | |

FOREIGN PATENT DOCUMENTS

| | | | | |
|---|---|---|---|---|
| DE | 10108495 | * | 8/2002 | ............... C02F 3/12 |
| JP | 2003061624 | * | 3/2003 | |
| WO | WO1998045228 | * | 10/1998 | ............. C07F 17/00 |

OTHER PUBLICATIONS

SBM Maschinen GmbH, 2002: English translation of DE 10108495.*
Fredenburgh et al, Application of Controlled Hydrogen-Ion Concentration for Antiseptic Use. J Am Pharm Assoc Am Pharm Assoc. Mar. 1951;40(3):126-31.*
Diniz et al, Use of response surface methodology to describe the combined effects of pH, temperature and E/S ratio on the hydrolysis of dogfish (*Squalus acanthias*) muscle. International Journal of Food Science and Technology, 1996 31, p. 419-426.*
Gilmartin et al, Production of Cod (*Gadus morhua*) Muscle Hydrolysates. Influence of Combinations of Commercial Enzyme Preparations on Hydrolysate Peptide Size Range. J. Agric. Food Chem. 2002, 50, 5417-5423.*
Faigh, Enzyme formulations for optimizing juice yields. Food Technology (Chicago) (1995), 49(9), 79-83.*
Hisatomi et al, 2003-english translation of JP 2003061624.*
Midler et al, A Model System for Evaluating Shear in the Design of Stirred Fermentors. Biotechnology and Bioengineering vol. VIII, pp. 71-84 (1966).*
USDA Lettuce, butterhead nutritional values. Downloaded Jan. 19, 2018.*
Lopez-Malo et al, Aspergillus flavus growth in the presence of chemical preservatives and naturally occurring antimicrobial compounds. International Journal of Food Microbiology 99 (2005) 119-128.*
Goodman, L.. and Gilman. A, Chapter 48, Antiseptics, Germicides, Fungicides, and Parasiticide, "Acids". In: "The Pharmacological Basis of Therapeutics," The Macmillan Company, New York. 1941 p. 823-827 and 838-842.*
Gurol, "Facts and Myths about Irrigation Water," www.eco-web.com/edi/051201.html, Dec. 2005.
Hoondal, et al., "Microbial alkaline pectinases and their industrial applications: a review," Appl. Microbiol. Biotechnol., Aug. 2002, 59(4-5):409-418.
CalRecycle, "State of Disposal and Recycling in California; 2017 Update" Aug. 15, 2017, Publication # DRRR-2017-01612, pp. 1-32, downloaded Jul. 18, 2018.
CalRecycle, "Short-Lived Climate Pollutants: Organic Waste Methane Emissions Reductions" May 22, 2018, pp. 1-4, downloaded from http://www.calrecycle.ca.gov/Climate/SLCP/default.htm on Jul. 18, 2018.

(Continued)

*Primary Examiner* — Sheridan Swope
(74) *Attorney, Agent, or Firm* — Duane Morris LLP

(57) ABSTRACT

The present invention relates to a process wherein organic material derived from plant and animal material is processed to recover nutritional elements. In particular, there is provided a process for releasing nutritional elements from plant and animal material comprising the steps of treating the material with one or more enzymes to digest said material under appropriate conditions and separating the resulting liquid hydrolysate from the undigested material.

7 Claims, No Drawings

(56) References Cited

OTHER PUBLICATIONS

Senate Bill No. 1383, Chapter 395. "An act to add Sections 39730.5, 39730.6, 39730.7, and 39730.8 to the Health and Safety Code, and to add Chapter 13.1 (commencing with Section 42652) to Part 3 of Division 30 of the Public Resources Code, relating to methane emissions." Created Sep. 20, 2016, pp. 1-8.
Oshins, C. US Composting Council "Greenhouse Gases and the Role of Composting: A Primer for Compost Producers" Dec. 3, 2008, pp. 1-3, Available online at compostingcouncil.org/.../GHG-and-Composting-a-Primer-for-Composters-final.pdf, downloaded Mar. 16, 2017.
Ventour, L. "WRAP, The food we waste. United Kingdom's Waste and Resources Action Programme (WRAP)", Banbury. ISBN: 1-84405-383-0 (version 2). 2008, pp. 1-237, Available online at: http://www.wrap.org.uk/downloads/The_Food_We_Waste_v2__2_.99cb5cae.5635.pdf.
Watson, "2017 Governor's Environmental and Economic Leadership Award Winners Honored," Jan. 17, 2018, pp. 1-3, https://calepa.ca.gov/2018/01/17/2017-governors-environmental-and-economic-leadership-award-winners-honored/, downloaded Aug. 9, 2018.

\* cited by examiner

METHODS AND COMPOSITIONS FOR DIGESTION OF ORGANIC WASTE

RELATED APPLICATIONS

The present application is a divisional of U.S. patent application Ser. No. 12/338,446, filed Dec. 18, 2008, which claims the benefit of U.S. Provisional Application No. 61/015,531 filed Dec. 20, 2007, both of which are hereby incorporated by reference in their entireties.

BACKGROUND OF THE INVENTION

The processing and disposal of organic waste streams are increasingly important topics of environmental, economical and technological concern. Organic waste is generated from different activities, such as industrial activities (e.g., organic waste from food processing manufacturers, restaurants, and grocery stores), agricultural activities (e.g., organic waste from gardens, farms, or cattle farms), and domestic activities (e.g., household waste). There are increasing problems in the handling of these plant and animal organic waste streams due to the continuously increasing amount produced. The problems are global in nature, but are particular acute in areas with very dense human populations and in areas with intense livestock production.

Traditional solutions to the problem of disposing of organic waste, such as landfill, incineration, or composting, are associated with various problems, e.g., processing space, building and operating costs, consumption of time resources, and environmental pollution. Thus, there is an environmental and industrial need to find methods and processes that, as opposed to disposal, allow for the recovery, release and/or utilization of the valuable nutrients in organic waste.

In this respect, several solutions have been proposed in the art. However, none is suitable for the processing of fresh organic waste, e.g., fresh food waste, as presented, for example, in supermarket organic waste, into nutrients that are in a bioavailable form. For example, discussed in U.S. Publication 26194299 (Brinch-Pedersen et al.) is a method for recycling slurry or sewage waste material (e.g., manure) derived from human, animal and industrial areas which must first be separated into liquid and solid fractions. U.S. Pat. No. 6,121,032 (Cooney Jr. et al.) teaches processes and compositions which may be used for facilitating the decomposition of foodstuff waste solids which are to be provided to a sewage treatment system (e.g., garbage disposal and septic tanks).

In contrast to the above-identified solutions proposed in the art, it is one signifimayt object of the present invention to provide a process for releasing and recycling important nutritional elements derived from organic waste in a bio-available form. The inventors of the present invention have found that there is a large potential for using various kinds of enzymes for solubilizing important nutritional elements present in organic waste (e.g., fresh food waste), thereby facilitating the release and increased availability of the important nutritional elements in a bioavailable form.

The process of the invention has the advantages of being capable of 1) giving a very high degree of released valuable nutritional elements from organic waste, including undenatured protein, natural oils, active enzymes, plant hormones, aerobic bacteria, and aerobic fungi, 2) reducing the overall cost and time for the treatment of waste, 3) increasing environmental sustainability and 4) sequestering of the carbon molecules.

In particular, the sequestering of the carbon molecules is accomplished by keeping the carbon within the end product in accordance with the following principles:

1. The use of fresh organic waste with minimized decomposition prevents the formation of gas (e.g., carbon dioxide ($CO_2$) and/or methane ($CH_4$)). Therefore, at the start of the enzymatic digestion processes as described herein, all of the original carbon content of the organic waste (e.g., fresh food waste) is present;
2. The process is done rapidly and aerobically. in order to minimize decomposition;
3. The resulting hydrolysate may be stabilized (e.g., using acid stabilization) such that decomposition of the enzymatically digested organic material has been minimized and stabilized and is therefore still 'fresh' when it is applied to the soil;
4. The resulting hydrolysate may be applied to soil as a fertilizer and this 'fresh' product—hydrolyzed food in its natural state—may become food for aerobic soil microbes living in the root zone of the plant. Soil microbes may turn the carbon in this material into plant available nutrients. The carbon is taken up directly into the plant and converted into plant material such that the carbon originally present in the initial organic waste is sequestered and incorporated back into plants; and
5. By supplanting the use of petro-chemical fertilizers and/or compost, carbon sequestration accomplished as described herein helps to prevent the leaching of carbon into the water supply or into the atmosphere by the 50-80% of all chemical fertilizers, including reduction of ammonia volatilization, which turns urea into ammonia gas, and denitrification, where nitrate-N is converted into gaseous forms (nitric oxide, nitrous oxide, dinitrogen). Similarly, supplanting of composting produces similar benefits as a typical compost pile will reduce its size by 50%, of which some signifimayt portion is due to the leaching of carbon into the groundwater and more still is gassed off as carbon dioxide and methane.

SUMMARY OF THE INVENTION

The present invention is based, in part, on the discovery that the processes described herein provide for releasing and recycling important nutritional elements derived from organic waste in a bioavailable form.

Accordingly, in one aspect, the invention features a process for the release of nutritional elements from organic waste comprising the steps of: (a) adding to said organic waste at least one enzyme or at least one mixture of enzymes; (b) incubating the organic waste of step (a) under appropriate conditions resulting in at least partial release of the nutritional elements as a liquid hydrolysate; and (c) separation of the undigested waste from the resulting liquid hydrolysate. In one embodiment, the organic waste is fresh food waste.

The enzymes used in step (a) may comprise at least two or more, e.g., three, four, five, six, seven, eight, nine, or ten enzymes. The two or more enzymes may be added together or sequentially to the organic waste in step (a). In another aspect, the two or more enzymes may be selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, glucose oxidase, pectinolytic enzyme, pectinesterase, peptidoglutaminase, peroxidase, polyphenoloxidase, proteolytic enzyme, protease, ribonuclease and transglutaminase. These enzymes may be selected, for example, from the group consisting of enzymes originating from microbial fermentation, enzymes derived from a microorganism, and enzymes derived from plants.

The incubating organic waste of step (b) may be under constant movement. In another aspect, the temperature of the incubating organic waste of step (b) is between 70° F. and 162° F. (e.g., between 125° F. and 140° F.). In yet another aspect, the incubating organic waste of step (b) may be incubated for between 0 hours and 2.5 hours (e.g., between 45 minutes and 1.5 hours). In one embodiment, the incubating organic waste of step (b) may output a liquid hydrolysate that is greater than 70 percent (e.g., greater than 90 percent) by weight relative to the weight of the input incubating organic waste.

The process separation step of step (c) may exclude undigested material of greater than 0.5 millimeters (e.g., greater than 1 mm) in diameter from the liquid hydrolysate.

In another aspect, the invention features a process for the release of nutritional elements from organic waste comprising the steps of: (a) adding to said organic waste at least one enzyme or at least one mixture of enzymes; (b) incubating the organic waste of step (a) under appropriate conditions resulting in at least partial release of the nutritional elements as a liquid hydrolysate; (c) separation of the undigested waste from the resulting liquid hydrolysate. In one embodiment, the organic waste is fresh food waste; and (d) stabilization of the liquid hydrolysate resulting from step (c).

The enzymes used in step (a) may comprise at least two or more, e.g., three, four, five, six, seven, eight, nine, or ten enzymes. The two or more enzymes may be added together or sequentially to the organic waste in step (a). In another aspect, the two or more enzymes may be selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, glucose oxidase, pectinolytic enzyme, pectinesterase, peptidoglutaminase, peroxidase, polyphenoloxidase, proteolytic enzyme, protease, ribonuclease and transglutaminase. These enzymes may be selected, for example, from the group consisting of enzymes originating from microbial fermentation, enzymes derived from a microorganism, and enzymes derived from plants.

The incubating organic waste of step (b) may be under constant movement. In another aspect, the temperature of the incubating organic waste of step (b) is between 70° F. and 162° F. (e.g., between 125° F. and 140° F.). In yet another aspect, the incubating organic waste of step (b) may be incubated for between 0 hours and 2.5 hours (e.g., between 45 minutes and 1.5 hours).

In one embodiment, the incubating organic waste of step (b) may output a liquid hydrolysate that is greater than 70 percent (e.g., greater than 90 percent) by weight relative to the weight of the input incubating organic waste.

The process separation step of step (c) may exclude undigested material of greater than 0.5 millimeters (e.g., greater than 1 mm) in diameter from the liquid hydrolysate.

The process stabilization step of step (d) may comprise addition and mixing of the liquid hydrolysate with an acid source. In one embodiment, the acid source may be selected from the group consisting of hydrochloric, sulfuric, phosphoric, acetic, stearic, propionic, tartaric, maleic, benzoic, or succinic acids. In another embodiment, the pH of the liquid hydrolysate is less than 7.0 (e.g., the pH of the liquid hydrolysate is 3.5).

In yet another aspect, the invention features a process for the release of nutritional elements from organic waste comprising the steps of: (a) adding to said organic waste at least one enzyme or at least one mixture of enzymes; (b) incubating the organic waste of step (a) under appropriate conditions resulting in at least partial release of the nutritional elements as a liquid hydrolysate; (c) coarse separation of the undigested waste from the resulting liquid hydrolysate. In one embodiment, the organic waste is fresh food waste; (d) stabilization of the liquid hydrolysate resulting from step (c); and (e) fine separation of the undigested waste from the resulting liquid hydrolysate.

The enzymes used in step (a) may comprise at least two or more, e.g., three, four, five, six, seven, eight, nine, or ten enzymes. The two or more enzymes may be added together or sequentially to the organic waste in step (a). In another aspect, the two or more enzymes may be selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, glucose oxidase, pectinolytic enzyme, pectinesterase, peptidoglutaminase, peroxidase, polyphenoloxidase, proteolytic enzyme, protease, ribonuclease and transglutaminase. These enzymes may be selected, for example, from the group consisting of enzymes originating from microbial fermentation, enzymes derived from a microorganism, and enzymes derived from plants.

The incubating organic waste of step (b) may be under constant movement. In another aspect, the temperature of the incubating organic waste of step (b) is between 70° F. and 162° F. (e.g., between 125° F. and 140° F.). In yet another aspect, the incubating organic waste of step (b) may be incubated for between 0 hours and 2.5 hours (e.g., between 45 minutes and 1.5 hours). In one embodiment, the incubating organic waste of step (b) may output a liquid hydrolysate that is greater than 70 percent (e.g., greater than 90 percent) by weight relative to the weight of the input incubating organic waste.

The process separation step of step (c) may exclude undigested material of greater than 0.5 millimeters (e.g., greater than 1 mm) in diameter from the liquid hydrolysate.

The process stabilization step of step (d) may comprise addition and mixing of the liquid hydrolysate with an acid source. In one embodiment, the acid source may be selected from the group consisting of hydrochloric, sulfuric, phosphoric, acetic, stearic, propionic, tartaric, maleic, 20 benzoic, or succinic acids. In another embodiment, the pH of the liquid hydrolysate is less than 7.0 (e.g., the pH of the liquid hydrolysate is 3.5).

The process separation step of step (e) may exclude undigested material of greater than 149 microns (e.g., greater than 300 microns) in diameter from the liquid hydrolysate.

In still another aspect of the invention, the organic waste to be digested in any of the 25 processes described herein may first be ground into particles prior to enzymatic digestion (e.g., first ground into particles less than ⅜ inch in diameter). In another embodiment, the liquid hydrolysate resulting from any of the processes described herein may be used as a nutraceutical, organic fertilizer, pharmaceutical, aquaculture feed, animal feed, or biostimulant. In still another embodiment, the liquid hydrolysate resulting from any of the processes described herein may be used as an enhanced feedstock of bioavailable nutrients for anaerobic or aerobic fermentation useful for the production of chemicals (e.g., biogases, biofuels, and alcohols).

In yet another aspect, the present invention provides an enzyme mixture comprising at least two enzymes, e.g., such as three, four, five, six, seven, eight, nine or ten enzymes, selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, pectinolytic enzyme, peptidoglutaminase, peroxidase, polyphenoloxidase, proteolytic enzyme, protease, ribonuclease and transglutaminase, or combinations thereof.

In a still further aspect, the invention relates to the use of the enzyme mixture according to the invention for releasing nutritional elements from organic waste according to any of the processes described herein.

DETAILED DESCRIPTION OF THE INVENTION

It is a primary object of the present invention to provide a process for releasing and recycling important nutritional elements derived from organic waste in a bioavailable form.

The inventors of the present invention have found that it is possible to utilize the resources present in organic waste by turning them into important and valuable nutritional elements. The methods and compositions of the invention allow the release of nutritional elements from organic waste through treatment with enzymes that, for example, and without limitation, degrade fats and oils (e.g., lipases), protein (e.g., proteases), starch (e.g., carbohydrases), sugars (e.g., glucose oxidases), fruit/pectin (e.g., pectinesterases), cellulose (e.g., cellulases), and/or hemicellulose (e.g., hemicellulases).

In addition, the inventors realized that bioavailability of the released nutrients derived from the enzymatically digested organic material may be improved by incorporating the step of stabilizing the liquid hydrolysate that is reacted by the enzymatic digestion of the organic material.

One will realize that the fresh organic material to be digested may be an important element for the methods of the present invention, in order to recycle important nutritional elements within using an enzymatic digestion process.

Thus, in an aspect of the present invention, there is provided a process for releasing nutritional elements from organic waste, the process comprising the steps of:
(a) adding to said organic waste at least one enzyme or at least one mixture of enzymes;
(b) incubating the organic waste of step (a) under appropriate conditions resulting in at least partial release of the nutritional elements as a liquid hydrolysate; and
(c) separation of the undigested waste from the resulting liquid hydrolysate.

In another embodiment, the process according to the invention, comprises the steps of:
(a) adding to said organic waste at least one enzyme or at least one mixture of enzymes;
(b) incubating the organic waste of step (a) under appropriate conditions resulting in at least partial release of the nutritional elements as a liquid hydrolysate;
(c) separation of the undigested waste from the resulting liquid hydrolysate; and
(d) stabilization of the liquid hydrolysate resulting from step (c).

In yet a further embodiment, the process according to the invention, comprises the steps of:
(a) adding to said organic waste at least one enzyme or at least one mixture of enzymes;
(b) incubating the organic waste of step (a) under appropriate conditions resulting in at least partial release of the nutritional elements as a liquid hydrolysate;
(c) coarse separation of the undigested waste from the resulting liquid hydrolysate;
(d) stabilization of the liquid hydrolysate resulting from step (c); and
(e) fine separation of the undigested waste from the resulting liquid hydrolysate.

In some embodiments of the present invention the nutritional elements or nutrients are selected from the group consisting of plant nutrients, metals, minerals, carbohydrates, peptides, and oils. In other embodiments, the plant nutrients are selected from the group consisting of phosphate, calcium, potassium, and nitrogen. In yet another embodiment of the present invention, the plant nutrient is phosphate, such as organic phosphate or inorganic orthophosphate.

In the present context, the terms "waste" and "organic waste" are used interchangeably and refer to any type of discarded organic material derived from human, animal or industrial areas. In one embodiment, the waste is selected from the group consisting of municipal sewage, household waste, slaughterhouse waste, human waste, plant waste such as from gardening, animal waste and industrial waste such as waste from the food, feed and pharmaceutical industry, e.g. waste from fermentation processes, brewing or production of recombinant enzymes. The waste may be provided from waste holding facilities, i.e., facilities for holding, storage or treatment of waste, including pits or lagoon where animal waste is stored. In the present context, the terms "fresh food waste" and "fresh food organic waste" are used interchangeably and refer to waste which has the following characteristics: 1. the fresh food waste is substantially firm with a shiny color, 2. any flesh will substantially spring back when pressed, 3. the fresh food waste is substantially free of discoloration or darkening around the edges, 4. the fresh food waste will smell substantially fresh and be substantially free of any ammonia, "rotten egg," "fishy," or other foul smell, 5. juice will not have substantially seeped from a substantial amount of fruit, and 6. the fresh food waste has been kept substantially at an appropriate temperature (e.g., constant refrigeration) to maintain freshness. By contrast, "decomposition" or "decomposing waste" refers to processes or material for which at least one of the following characteristics is present: 1. the waste is substantially soft with a dull color, 2. any flesh will not substantially spring back when pressed or has lost its shape or firmness, 3. the waste has substantial darkening around the edges, or substantial brown, black, green or yellow discoloration, 4. the waste emits a substantial foul odor, including, but not limited to the scent of ammonia, "rotten egg," "fishy," vinegar, yeast, or mold, 5. fungal (mold) or bacterial growth is substantially present, or 6. the waste has not substantially been kept at an appropriate temperature to ensure freshness. With regard to these criteria, the terms "substantial" and "substantially" may refer to 50%, 55%, 60%, 65%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 93%, 94%, 95%, 96%, 97%, 98%, 99%, 99.5%, 99.9%, or greater of the organic waste as a whole or characteristic of particular elements of the organic waste under consideration.

The use of fresh food waste may be critical for obtaining as high a content of nutrients as possible from the waste. Through careful observation, the present inventors have identified processes that minimize decomposition of organic waste such that it is kept in a fresh state. In one embodiment, the processes of the invention involves the use of organic waste, e.g., fresh food waste, specifically subjected to handling conditions that minimize degradation, decomposition, or an initial release of nutrients and carbohydrates. In one embodiment, the fresh food waste may be provided from waste holding facilities, e.g. facilities for holding, storage or treatment of fresh food waste, including supermarket facilities. For example, pre-weighed containers may be filled with fresh food waste such that the weight of the fresh food waste contents is known and tracked (e.g., by a barcode and/or computer tracking system). The containers may be cleaned and sterilized prior to being used to collect fresh food waste according to methods well known in the art. In another embodiment, the containers may be insulated in order to help ensure appropriate temperatures required to maintain freshness, and/or hold relatively small volumes of fresh food waste (e.g., 1,000 pounds or less), and/or have sealable lids to help ensure freshness. In still other embodiments, the containers may be collected frequently (e.g., three days per week) and transported to a processing facility, optionally, using refrigerated conditions during transport (e.g., refrigerated trucks). The organic waste, e.g., fresh food waste, may optionally be source separated into separate categories of waste, e.g., vegetable waste versus animal meat waste. In the food industry, the term "source separation" typically refers to the sequestration of trash components (e.g., paper, plastic, "rubbish", cardboard, glass, newspaper, and aluminum and steel) away from organic waste. In addition to this common definition within the art, the term "source separation" may alternatively refer to the sequestration of different types of organic waste streams (e.g., bakery, deli, seafood, produce, and packaged goods) whether they contain trash components or not. Produce can be defined as agricultural products and especially fruits and vegetables as distinguished from grain and other staple crops. Through careful observation, the present inventors determined that isolation of different types of organic waste streams allows for the production of consistent and defined commingled raw material for enhanced digestion by the enzymes described herein. In this respect, the proportion of trash components present within the raw organic material to be digested may be 1%, 2%, 3%, 4%, 5%, 10%, 20%, 30%, 40%, 50%, or more by weight or volume of the raw organic material or any range in between to be digested since these components will subsequently be removed when the resulting liquid hydrolysate is separated from the undigested waste. In addition, the organic waste to be enzymatically digested, e.g., fresh food waste, does not need to be separated according to liquid and solid phases.

Optionally, the organic waste, e.g., fresh food waste, is ground into particles of a defined average size. The ground particles, on average, may have a length of any side less than 10 inches, 9 inches, 8 inches, 7 inches, 6 inches, 5 inches, 4 inches, 3 inches, 2 inches, 1 inch, ⅞ inch, ¾ inch, ⅝ inch, ½ inch, ⅜ inch, ¼ inch, ⅛ inch, 1/16 inch or less. In a further step of the present invention, the organic waste, e.g., fresh food waste, is subjected to an enzymatic digestion step, which is achieved by treatment with one or more appropriate enzymes. In one embodiment, two or more enzymes, e.g., three, four, five, six, seven, eight, nine or ten enzymes, are added to the organic waste, e.g., fresh food waste.

In another embodiment, the enzyme(s) is selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, glucose oxidase, pectinolytic enzyme, pectinesterase, peptidoglutaminase, peroxidase, polyphenoloxidase, proteolytic enzyme, protease, ribonuclease and transglutaminase, or combinations hereof. The addition of xylanase, asparaginase, glumayase, beta-glumayase (endo-1, 3(4)-) and cellulase results in a degradation of the cell wall of the lignocellulosic material present in the waste, whereas the protease degrades protein, lipase degrades lipid and starch is degraded by the addition of amylase and carbohydrase. The skilled artisan will appreciate that particular enzymes with substantially the same functions as those enzymes listed above are well known in the art, including the parameters required for determining optimal enzymatic activity and determining cohabitability with other enzymes such that all enzymes that cohabitat are functionally active. For example, 0.01 g, 0.05 g, 0.1 g, 0.15 g, 0.2 g, 0.25 g, 0.3 g, 0.35 g, 0.4 g, 0.45 g, 0.5 g, 0.55 g, 0.6 g, 0.65 g, 0.7 g, 0.75 g, 0.8 g, 0.85 g, 0.9 g, 0.95 g, 1.0 g (i.e., the weight of 50 mL of enzyme given that the density of the enzymes solutions is similar to that of water), 1.05 g, 1.1 g, 1.15 g, 1.20 g, 1.25 g, 1.30 g, 1.35 g, 1.40 g, 1.45 g, 1.50 g, 1.55 g, 1.60 g, 1.65 g, 1.70 g, 1.75 g, 1.80 g, 1.85 g, 1.90 g, 1.95 g, 2.00 g, or more or any range in between of per each enzyme(s) (e.g., Asparaginase (3,500 ASNU/g, Acrylaway® L, Novozymes, Inc.), Beta-glucanase (endo-1, 3(4)-) (100 FBG/g, Peelzym® or Viscozyme® L, Novozymes, Inc.), Cellulase (700 EGU/g, Celluclast®, 1.5L, Lot # CCNO3079, Novozymes, Inc.), Protease (2.4 AU-A/g, Alcalase 2.4 LFG®, Lot #PLN05317, Novozymes, Inc.), Alpha-amylase (400 KNU-B/g, Ban 480L®, Lot # ADN04234 or Liquozyme Supra®, Lot # NBPG0002, Novozymes, Inc.), Lipase (100 KLU/g, Greasex 100L®, Lot #LAP40013, Novozymes, Inc.), Pectinase (Pectinex 100L Plus®, Lot # KV5530100, Novozymes, Inc.), Glucoamylase (Dextrozyme DX®, Lot #NCPP0044, Novozymes, Inc.), and/or Xyalanase (Shearzyme 500L®, Lot # CDN00243, Novozymes, Inc.) may be added per $8 \times 10^4$ gram basis of organic waste.

If the enzymes are added together to the solid waste phase, the enzymes may be added as a mixture or cocktail of enzymes or as a composition comprising multiple enzymatic activities. Such a mixture or composition may be a commercial product or be prepared on site. In one embodiment, the mixture of enzymes comprises at least two enzymes, e.g., three, four, five, six, seven, eight, nine or ten enzymes, selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, glucose oxidase, pectinolytic enzyme, pectinesterase, peptidoglutaminase, peroxidase, polyphenoloxidase, proteolytic enzyme, protease, ribonuclease and transglutaminase, or combinations thereof. Examples of mixtures or compositions are described herein.

In one embodiment of the present invention, the enzymatic treatment is performed with an enzyme(s) selected from the group consisting of an enzyme(s) which originates from microbial fermentation, enzyme(s) derived from a microorganism, such as a genetic engineered microorganism, or enzyme(s) derived from a plant, e.g., a genetically engineered plant.

In accordance with the present invention, the organic waste, e.g., fresh food waste, to be digested is kept under appropriate conditions resulting in at least partial release of the nutritional elements during the enzymatic digestion process. In the present context, the expression "appropriate conditions" relates to a specific temperature, time, pH, pressure, and mechanical force in accordance with the enzyme or enzymes used. The organic waste may be digested, i.e., bonds are cleaved, without, or with minimized, decomposition.

In one embodiment, the process temperature, i.e., the temperature during the enzymatic digestion, may be between 0° F. and 165° F., such as between 70° F. and 162° F., or 70° F. and 155° F., or 125° F. and 140° F., or any range in between. In another embodiment, the temperature during the enzymatic digestion is 132.5° F. The process temperature should be below about 140° F. in order to prevent decomposition of the protein components within the digested sample. In some embodiments, the temperature at which the enzymatic digestion step occurs is less than about 140° F. However, it will be appreciated that the temperature employed may be within the optimum temperature of the enzyme(s) used in the process. A skilled artisan will also appreciate that lower incubation temperatures may be compensated with longer incubation times or a higher relative concentration of the enzymatic composition, or both.

In one embodiment, the process pH, i.e., the pH during the enzymatic digestion, may be between 0 and 7.0 including any range in between (e.g., 4.5 to 5.0). A skilled artisan will appreciate that different enzymes optimally operate within different pH ranges. In one embodiment, enzymes are selected such that they may cohabitate and maintain their function in a neutral or acidic environment. In general, organic waste digested using the processes described herein have a pH within the range of 4.5 to 5.0. In many cases, the enzymatic digestion treatment may be carried out with satisfactory results without any adjustment of the pH before, or during, the performance of the treatment. However, for some types of waste materials, it may be advantageous to adjust the pH of the waste material prior to or during enzymatic digestion. The pH may be decreased, i.e., acidic conditions or the pH of the reaction mixture may be increased by adding appropriate amounts of an acid or base, respectively, and/or a buffer system according to methods well known in the art. However, it will be appreciated that the pH employed may be within the optimum pH range of the enzyme(s) used in the process.

It has been the inventors' observation that by sustaining a constant movement of the organic waste, e.g., fresh food waste, the digestion is improved. Thus, in one embodiment, the enzymatic digestion step, or during all the steps of the present process, is under constant agitation, shear, and/or pressure. For example, an enzymatic digestion apparatus may contain a rotating shaft driven by a motor to which is fixed two screws oriented in opposite directions such that mechanical shear forces are exerted against the digesting organic material within the fixed enclosure.

The time allotted for the enzymatic digestion in the methods of the present invention is such that nutrient recovery from the digested organic waste occurs, e.g., fresh food waste, in a bioavailable form. The process time is generally between 0 hours and about 2.5 hours. The batch may be brought uniformly up to a desired temperature. From that point, it may take between from about 45 minutes to about 1.5 hours. The time is determined by when the material has reached its maximum yield. In one embodiment, the maximum yield occurs at 20%, 30%, 40%, 50%, 60%, 70%, 75%, 80%, 81%, 82%, 83%, 84%, 85%, 86%, 87%, 88%, 89%, 90%, 91%), 92%, 93%), 94%), 95%, 96%, 97%, 98%, 99%, 99.5% or greater hydrolysis (i.e., % weight of free flowing liquid hydrolysate relative to the total input weight of the organic material to be digested) or any range in between. In one embodiment, an enhanced yield occurs when the batch is >90% hydrolyzed. In another embodiment, the conditions in which the enzymatic digestion is performed are such that, upon completion of the reaction, a hydrolysate containing peptides with an average molecular weight less than 1, 10, 100, 200, 300, 400, 500, 600, 700, 800, 900, 1000 Daltons, such as less than 1, 1.5, 2, 2.5, 3, 3.5, 4, 4.5, 5, 5.5, 6, 6.5, 7, 7.5, 8, 8.5, 9, 9.5, or 10 kiloDaltons.

After the enzymatic digestion step, the resulting hydrolysate is filtered in order to remove undigested material which may be collected and returned to another round of enzymatic digestion. The separation step may be performed using a number of methods to separate out undigested material of a given size. In one embodiment, the hydrolysate is passed through a mesh attached to an agitator, e.g., a vibratory sieve. The size of the undigested material that is separated from the hydrolysate is determined by the size of the openings created by the mesh or sieve. In representative embodiments, the size of the openings in the mesh or sieve precludes objects of greater than 10, 20, 30, 40, 50, 60 70, 80, 90, 100, 110, 120, 130, 140, 149, 150, 160, 170, 180, 190, 200, 300, 400, 500, 600, 700, 800, 900 microns or more in diameter, such as objects greater than 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 30, 40, 50, 60, 70, 80, 90, 100, 110, 120, 130, 140, 150, 160, 170, 180, 190, 200, 300, 400, 500 or 1000 millimeters in diameter or any range in between. In another embodiment, the hydrolysate may be separated using known methods, such as centrifugation, filter press, or air classifier methods.

The hydrolysate in which undigested organic matter of a specified size has been separated may subsequently be subjected to a stabilization step. In one embodiment, the hydrolysate is stabilized with acid (e.g., liquid acid sources including, for example, hydrochloric, sulfuric, phosphoric, acetic, stearic, propionic, tartaric, maleic, benzoic, or succinic acids) such that the hydrolysate has a pH of less than 7.0. In another embodiment, the acidic pH of the hydrolysate is 3.5. Low pH inhibits microbial and/or pathogenic activity during storage and transport of the hydrolysate. An acid source is thoroughly blended in with the hydrolysate for some amount of time (e.g., for at least 2 hours, 4 hours, 8 hours, 12 hours, 16 hours, 24 hours, or longer) in order to stabilize the pH.

The stabilized hydrolysate may be separated in order to remove undigested material. The separation step may be performed using a number of methods to separate out undigested material of a given size. In one embodiment, the hydrolysate is passed through a mesh attached to an agitator, e.g., a mechanical agitator. The size of the undigested material that is separated from the hydrolysate is determined by the size of the openings created by the mesh. In representative embodiments, the size of the openings in the mesh or sieve precludes objects of greater than 10, 20, 30, 40, 50, 60 70, 80, 90, 100, 110, 120, 130, 140, 149, 150, 160, 170, 180, 190, 200, 300, 400, 500, 600, 700, 800, 900 microns or more in diameter, such as objects greater than 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 30, 40, 50, 60, 70, 80, 90, 100, 110, 120, 130, 140, 150, 160, 170, 180, 190, 200, 300, 400, 500 or 1000 millimeters in diameter or any range in between. In one embodiment, the size of the openings in the mesh precludes objects of greater than 149 microns in diameter, as this ensures that the resulting hydrolysate will be able to flow unimpeded through hydrolysate applicators, such as drip irrigation, spray rig, and fertigation equipment without generating. In another embodiment, the hydrolysate may be separated using known methods, such as centrifugation, filter press, or air classifier methods.

The filtered hydrolysate may be marketed in suitable containers such as plastic or metal drums or it may be transported in bulk in tanks Prior to transport, the filtered hydrolysate may be checked in a quality control step including, for example, analyses of pH and gas levels. The filtered hydrolysate may also be used in a variety of manners, including, for example, as nutraceuticals, organic fertilizers, pharmaceuticals, aquaculture feeds, animal feeds, and biostimulants. In one embodiment, additives may be added to alter the qualities of the filtered hydrolysate (e.g., addition of kelp, molasses, and humic acids). In other embodiments, the hydrolysate may be concentrated such that the hydrolysate has a dry solid residue concentration of at least 5%, 10%, 15%, 20%, 25%, 30%, 35%, 40%, 45%, 50%, 55%, 60%, 65%, 70%, 75%, 80%, 85%, 90%, 95%, 99%, or greater or any range in between. For example, the concentration may be performed in a system for continuous concentration under vacuum, the degree of concentration being monitored by a mass measurer. Alternatively, the hydrolysate may be concentrated to dryness, for example, by spray-drying, thus producing a final product in powder form.

The separated hydrolysate resulting from the enzymatic digestion process described herein, alone or further processed according to the optional steps described herein, allows for the recovery of nutrients from digested organic waste, e.g., fresh food waste, in a bioavailable form. Such processing conditions the nutrients for relatively rapid uptake by soil microorganisms and plants, as contrasted with the more extended period required for bio-degrading the cellular components of manures and organic wastes incorporated into soils as fertilizers. Such processing also conditions the nutrients for rapid metabolization when the filtered hydrolysate is used as an aquaculture or animal feed.

In one embodiment, the process described herein may be adapted and coupled with a process for producing biofuels, such as biogas or alcohols. The concentrated nutrient availability in a bioavailable form represents an enhanced feedstock for biogas producing microorganisms. The hydrolysate may thus be used by one or more microorganisms to produce fermentation products such as ethanol. Any microorganism capable of converting a carbon source (e.g., glucose) to a biofuel (e.g., ethanol) may be used in the process according to the invention. For example, a suitable microorganism may be a mesophilic microorganism (i.e. one which grows optimally at a temperature in the range of 20-40° C.), e.g. a yeast also referred to as "baker's yeast", *Saccharomyces cerevisiae*.

It will be understood, that a useful ethanol-fermenting organism may be selected from a genetically modified organism of one of the above useful organisms having, relative to the organism from which it is derived, an increased or improved useful chemical forming activity (e.g., biofuel-fermenting activity).

An anaerobic or aerobic fermentation may employ one or more fermenting microorganisms capable of degrading or converting substances present in the organic waste to form, e.g., combustible fuel, such as methane. In one embodiment of the present invention, an initial treatment of the waste is performed using methane-producing microorganisms (also known as methanogens), which constitute a group of prokaryotes that are capable of forming methane from certain classes of organic substrates, methyl substrates or acetate under anaerobic conditions. It will be appreciated that useful methanogenic bacteria may be selected from a genetically modified bacterium of known methanogenic bacteria, having, relative to the organism from which it is derived, an increased or improved methane producing activity. Other useful microorganisms which could be used in an anaerobic fermentation of the waste include certain fermentative anaerobic bacteria capable of converting, for example, glucose to products such as acetate, propionate, butyrate, hydrogen and $CO_2$, and so-called acetogenic bacteria, which convert organic substances such as propionate, butyrate and ethanol to acetate, formate, hydrogen and $CO_2$.

The process according to the invention is in particular suitable for applications coherent with large-scale waste management systems. When the process is performed for downstream biogas production, excess heat from the biogas production plant may be utilized as process energy in the incubation processes.

In a further aspect, the present invention provides the nutritional element obtained in the process (e.g. hydrolysate) according to the invention for use as nutraceuticals, organic fertilizers, pharmaceuticals, aquaculture feeds, animal feeds, and biostimulants.

In yet another aspect, the present invention provides an enzyme mixture comprising at least two enzymes, e.g., three, four, five, six, seven, eight, nine or ten enzymes, selected from the group consisting of xylanase, asparaginase, cellulase, hemicellulase, glumayase, beta-glumayase (endo-1,3(4)-), urease, protease, lipase, amylase, phytase, phosphatase, aminopeptidase, amylase, carbohydrase, carboxypeptidase, catalase, chitinase, cutinase, cyclodextrin glycosyltransferase, deoxyribonuclease, esterase, alpha-galactosidase, beta-galactosidase, glucoamylase, alpha-amylase, alpha-glucosidase, beta-glucosidase, haloperoxidase, invertase, laccase, mannosidase, oxidase, pectinolytic enzyme, peptidoglutaminase, peroxidase, polyphenoloxidase, proteolytic enzyme, protease, ribonuclease and transglutaminase, or combinations thereof.

In a still further aspect, the invention relates to the use of the enzyme mixture according to the invention for releasing nutritional elements from waste.

This invention is further illustrated by the following examples which should not be construed as limiting. The contents of all references, patents and published patent applications cited throughout this application are incorporated herein by reference.

EXAMPLES

Example 1

The following example describes an exemplary process for releasing nutritional elements in a bioavailable form from enzymatic digestion of fresh organic waste. Fresh organic waste is obtained and handled so as to minimize biological degradation, which includes the steps of frequent waste pickup (e.g., before 36 hours after discarding as elapsed), materials are kept refrigerated at all times, training personnel on source separation and being able to identify decomposition and proper use of the specialized containers, and specialized waste containers specifically designed for each waste stream. The fresh food waste is ground to particles less than ½ inch in length. An enzyme cocktail comprising 1 gram (i.e., the weight of 50 mL of enzyme given that the density of the enzymes solutions is similar to that of water) of each enzyme (e.g., 1 g of Asparaginase (3,500 ASNU/g, Acrylaway® L, Novozymes, Inc.), 1 g of Beta-glucanase (endo-1,3(4)-) (100 FBG/g, Peelzym® or Viscozyme® L, Novozymes, Inc.), 1 g of Cellulase (700 EGU/g, Celluclast®, 1.5L, Lot # CCNO3079, Novozymes, Inc.), 1 g of Protease (2.4 AU-A/g, Alcalase 2.4 LFG®, Lot #PLN05317, Novozymes, Inc.), 1 g of Alpha-amylase (400 KNU-B/g, Ban 480L®, Lot # ADN04234, Novozymes, Inc.), and 1 g of Lipase (100 KLU/g, Greasex 100L®, Lot #LAP40013, Novozymes, Inc.) is added per $8 \times 10^4$ gram of organic waste to be enzymatically digested. The mixture is then added to a digestion tank an allowed to incubate for up to 2.5 hours, generally between 45 minutes and 1.5 hours, and at a temperature of between 125° F. and 140° F. under constant stirring and atmospheric pressure. The mixture is incubated such that a resulting liquid hydrolysate is typically greater than 90% or 95% or more by weight relative to the weight of the initial organic waste loaded. The hydrolysate is generally filtered from coarse materials greater than $1/16^{th}$ in. in diameter by mechanical agitation and separation through a mesh. The coarse-filtered hydrolysate is subsequently pumped to intermediate storage tanks and mixed with acid in the ratio of 20 liters acid to 1000 liters of hydrolysate for 4 hours or longer until the pH is less than 7.0 (e.g., until the pH is 3.5). After acid stabilization, the liquid hydrolysate is fine-filtered by mechanical agitation and separation through a mesh comprising pores of 100 US Sieve Mesh, which excludes particles larger than 149 microns. Excluded material resulting from either of the filtration steps may be re-digested, composted, or used as a substrate for anaerobic digestion. The fine-filtered hydrolysate is pumped into storage tanks until ready for dispensation into smaller volumes for transport and sale.

Example 2

The following example demonstrates that nutritional elements are released in a bioavailable form upon execution of the processes as described herein. Unground material, using only alcalaise enzymes produces a 66% yield of hydrolysate. The same yield was achieved when processed at 125° F., 130° F., 140° F., and 160° F. Each temperature range was checked at 30 minutes intervals to determine what percentage of hydrolysate was being achieved. Each digest was allowed to run for 3½ hours before the experiment was stopped. Each test produced a yield of 66%+/−2%.

The same tests were run as above with unground material and using alcalaise and nature pepsim from squalus amaythias. Yields from each test improved slightly to 71%+/−2%. Unground material was subsequently processed at the same temperature and time ranges as above using the 6 enzymes (main enzymes) from Lew's selection as well as natural pepsim from squalus amaythias and resulted in a maximum yield of 78% at 145° F. for 2.5 hours. Finally, material ground to less than ⅜" in diameter, when processed using the using the same enzyme set as the previous test, as well as the same time and temperature range, produced a yield of 95%.

INCORPORATION BY REFERENCE

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A process for the release of nutritional elements from fresh food organic waste to produce a stabilized, isolated liquid hydrolysate the process comprising the steps of:
   (a) providing fresh food organic waste;
   (b) grinding the fresh food organic waste into particles less than an average size of $\frac{5}{8}^{th}$ inch in diameter prior to enzymatic digestion to produce ground fresh food organic waste;
   (c) adding to said ground fresh food organic waste a mixture of enzymes comprising one or more of a lipase, a protease enzyme, a pectinase enzyme, alpha amylase, and a cellulase;
   (d) incubating the ground fresh food organic waste of step (c) under both constant agitation and mechanical shear force conditions at a temperature between 70 degrees F. and 162 degrees F.;
   (e) separating undigested particles from the resulting liquid hydrolysate using a mesh or sieve, thereby obtaining an isolated liquid hydrolysate; and
   (f) stabilizing the isolated liquid hydrolysate resulting from step (e), by adding to and mixing the liquid hydrolysate with an acid source to inhibit microbial and pathogenic activity of the liquid hydrolysate fertilizer to produce a stabilized, isolated liquid hydrolysate,
   wherein the incubating ground fresh food organic waste of step (d) produces a liquid hydrolysate that is greater than 80 percent by weight relative to the weight of the fresh food organic-waste of step (a).

2. The process according to claim 1, wherein the incubating ground fresh food organic waste of step (d) is for 3.5 hours or less.

3. The process according to claim 2, wherein the incubating ground fresh food organic waste of step (d) is between 45 minutes and 2.5 hours.

4. The process according to claim 1, wherein the incubating ground fresh food organic waste of step (d) produces a liquid hydrolysate fertilizer that is greater than 90 percent by weight relative to the weight of the fresh food organic-waste of step (a).

5. The process according to claim 1, wherein the acid source is selected from the group consisting of hydrochloric, sulfuric, phosphoric, acetic, stearic, propionic, tartaric, maleic, benzoic, and succinic acid.

6. The process according to claim 5, wherein the pH of the stabilized, isolated liquid hydrolysate is below 7.0.

7. The process according to claim 1, wherein the separating in step (e) uses a mesh or sieve which precludes objects of greater than 149 microns from passing through the mesh or sieve.

* * * * *